United States Patent [19]

Duvall

[11] Patent Number: 4,921,151
[45] Date of Patent: May 1, 1990

[54] BICYCLE REAR CARRIER PACK
[75] Inventor: Anna E. Duvall, Saxton, Pa.
[73] Assignee: Cannondale Corporation, Georgetown, Conn.
[21] Appl. No.: 779,686
[22] Filed: Sep. 24, 1985
[51] Int. Cl.⁵ .............................................. B62J 7/00
[52] U.S. Cl. ............................... 224/32 R; 224/32 A; 190/125
[58] Field of Search ................... 224/32 R, 32 A, 209; 190/125; 150/52 R

[56] References Cited

U.S. PATENT DOCUMENTS

| | | | |
|---|---|---|---|
| 3,681,872 | 8/1972 | Leitch | 150/52 R |
| 3,980,216 | 9/1976 | Nye | 224/209 |
| 4,082,208 | 4/1978 | Lane, Jr. | 224/209 |
| 4,143,695 | 3/1979 | Hoehn | 150/52 R |
| 4,260,085 | 4/1981 | Jefferson | 224/32 R |
| 4,375,828 | 3/1983 | Biddison | 150/52 R X |
| 4,513,895 | 4/1985 | Leslie | 224/259 X |

Primary Examiner—Henry J. Recla
Attorney, Agent, or Firm—Brumbaugh, Graves, Donohue & Raymond

[57] ABSTRACT

A bicycle rear carrier pack has a rigid interior insulating receptacle and a removable, flexible outer enclosure that fits snugly over the receptacle. An insulating sheet is secured to the top of the enclosure to cover the receptacle when the top of the enclosure is closed, and an insulating bead at least partially thermally seals the top to the receptacle when the pack is closed.

11 Claims, 3 Drawing Sheets

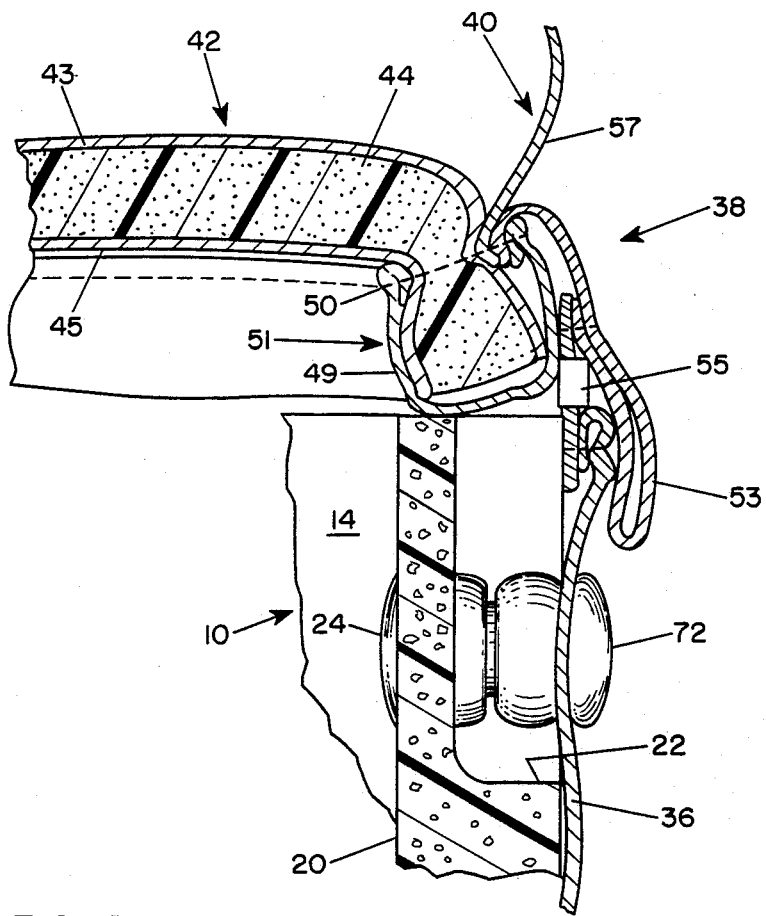
FIG. 3
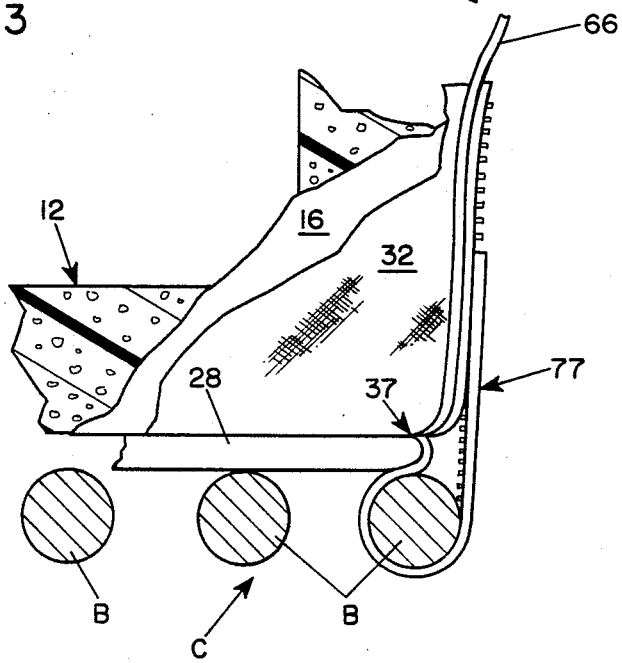

BICYCLE REAR CARRIER PACK

BACKGROUND OF THE INVENTION

The present invention relates to a pack designed to be attached to the platform of a bicycle rear carrier rack.

Recreational bicyclists often carry food and cold drinks and items such as cameras and binoculars with them when bicycling, and bicycle packs of various kinds for such articles are widely available. A popular bicycle pack is one that rests on top of and is secured to the platform of a rear carrier rack, which can be termed a "rackpack." The state-of-the-art rackpacks, which are produced by several manufacturers, are bags about the same width and length as the rack platform and of suitable height, say 6 or 9 inches, with hook and loop cloth straps, one at each corner of the bottom, to fasten the rackpack to bars of the platform. Rackpacks are made of a suitable fabric and have tops that open along one, two, or three edges via a zipper closure for access to the interior.

It is well known among experienced cyclists that all packs and the gear in them should be secured to the bicycle as immovably as possible. In the case of rackpacks and panniers, any swinging or swaying of the packs or the gear from side to side produces "tail-wagging" of the bicycle. The increased balance and steering efforts to offset the tail-wagging use the cyclist's energy unnecessarily.

"Soft" rackpacks, i.e. ones that do not have a fixed shape, are especially prone to cause tail-wagging if the gear they hold is not carefully packed, and indeed, sometimes when they are carefully packed. The flexibility of the fabric is poorly suited to restrain movement of the contents. The load is relatively high on the bicycle so that side sway of the bicycle subjects the load to considerable movement. Furthermore settling of the content of a soft rackpack often results in part or all of the pack and its content hanging to one side or the other, unevenly loading the bicycle.

The art has foreseen the usefulness of providing thermal insulation in rackpacks and has stitched sheets of flexible polymeric foam into the bottom, top and walls in the manner of soft cold drink packs available for general use. Conveniently, the foam sheets also increase the stiffness of the walls somewhat, which then provide some control of the load for reduced tail-wagging. Nevertheless, considerable flexibility remains, especially in the upper part of the pack where it is not firmly affixed to the rack. While these thermal rackpacks insulate better than a standard rackpack, they are not water tight at the seams, so if the user adds ice, to keep beverages cold, for example, the water from the melting ice can drip down on the bicycle parts below. Resulting wetness of the bag itself makes it likely to pick up dirt from the ground or another resting place. Such wetness also detracts from the desirability of converting the pack to a portable carrier. If the rackpack has external pockets, the water can soak into them to wet whatever gear they contain.

SUMMARY OF THE INVENTION

There is provided, in accordance with the present invention, a bicycle rear carrier pack comprising a receptacle having a bottom, side and end walls, all of a substantially rigid thermal insulating material, and an outer enclosure for the receptacle having a bottom, side and end walls, and a top, all of flexible material. The outer enclosure closely fits over the receptacle and is fastened to it. Suitable means are provided for fastening the outer enclosure of the rackpack to the platform of a bicycle rear carrier rack.

In preferred embodiments the top wall of the enclosure includes a sheet of thermally insulating material, such as a flexible and soft polymeric foam. The receptacle is formed in one piece from a substantially rigid liquid impermeable polymeric foam. The top of the enclosure is joined to one of the side walls or end walls and suitable means, such as a zipper is provided for releasably closing the top to the remaining side and end walls of the enclosure. A downward projecting bead along edges of the top of the enclosure is brought proximate the upper edges of the receptacle when the pack is closed to thermally seal the juncture of the top insulating sheet and the side walls of the receptacle. The enclosure is fastened to the receptacle by releasable fasteners, such as snaps, so that the receptacle can be removed from the enclosure. Parts of the snaps secured to the inner rigid receptacle are located in recesses formed in the outer surface of the receptacle.

The rackpack of the present invention provides several advantages over previously known rackpacks. The rigidity of the receptacle significantly reduces the possibility of side-to-side shifting or swaying of the receptacle due to flexure of walls of the rackpack. This substantially reduces the likelihood of the tail-wagging effect of a shifting load that is so common with a soft rackpack. This likelihood is further minimized when the user takes care to load articles into the rackpack in a way that will prevent movement of the packed articles. The rigid walls of the receptacle provide excellent protection and retention for its content. Thus, properly packed, relatively fragile and expensive articles, such as camera equipment and binoculars, can be safely carried in the pack with reduced fear of being damaged by a fall or a blow from the outside. The receptacle cannot leak, and therfore the problem of leakage of melting ice is eliminated. In its preferred form, in which the enclosure is releasably fastened to the receptacle, the rackpack can be disassembled to permit thorough cleaning of the outer receptacle by machine washing.

For better understanding of the invention reference may be made to the following description of an exemplary embodiment, taken in conjunction with the figures of the accompanying drawings.

DESCRIPTION OF THE DRAWINGS

FIG. 3 is a fragmentary view, partly in cross-section, of the rackpack secured to a bicycle rear carrier rack.

DESCRIPTION OF THE EMBODIMENT

Figure 2:
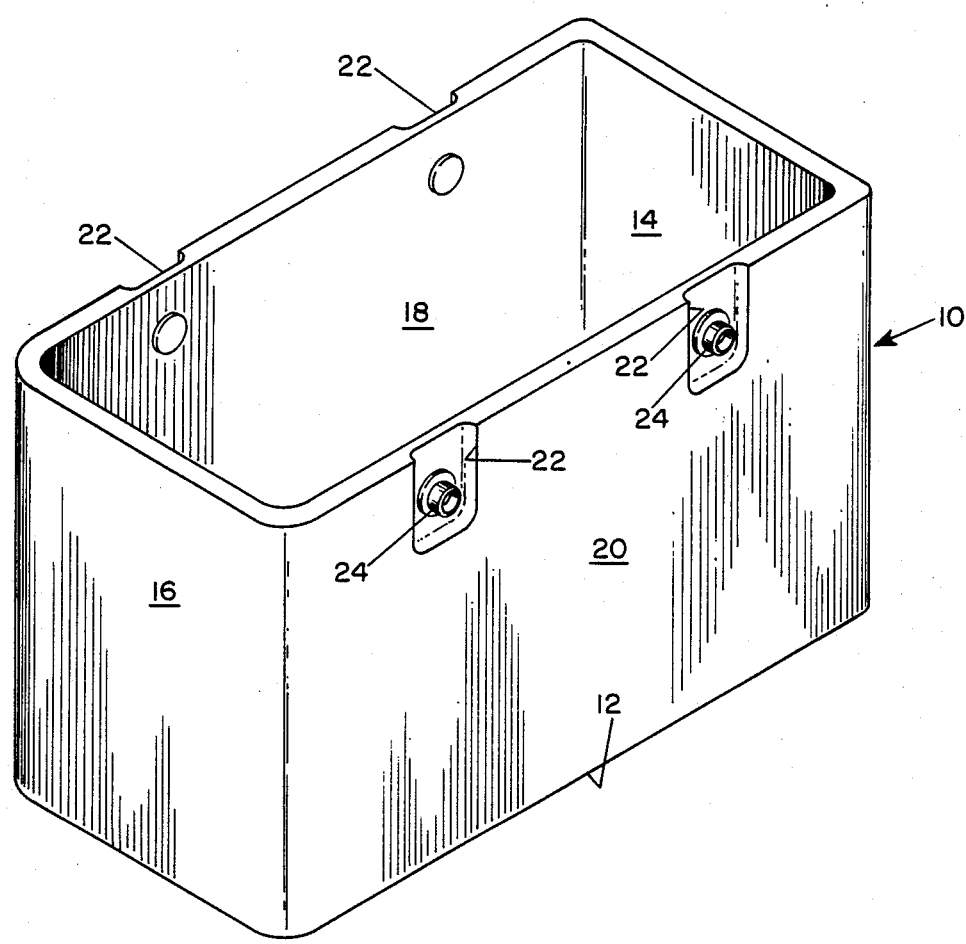
FIG. 2 is a perspective view of the receptacle of the embodiment of FIG. 1.

Referring first to FIG. 2 of the drawings, a rackpack receptacle 10 has a bottom 12 (see also FIG. 3) end walls 14 and 16 and side walls 18 and 20. It is made of a substantially rigid polymeric foam, such as freon blown, closed cell polyurethane foam that is lightweight, durable, hard, strong, and resilient. The receptacle 10 is molded in one piece, which means that it is easy to make. It provides very effective thermal insulation and cannot leak. While it is substantially rigid, it has sufficient resilience to absorb considerable impact without breaking because it yields to an impact, unlike rigid polystyrene, which is brittle and frangible. Shallow recesses 22 are formed in each side of the receptacle at its top and one element 24 of a rivet-type snap fastener pair is installed in each recess. The elements 24 project outward no farther than the outer surfaces of the receptacle.

Figure 1:
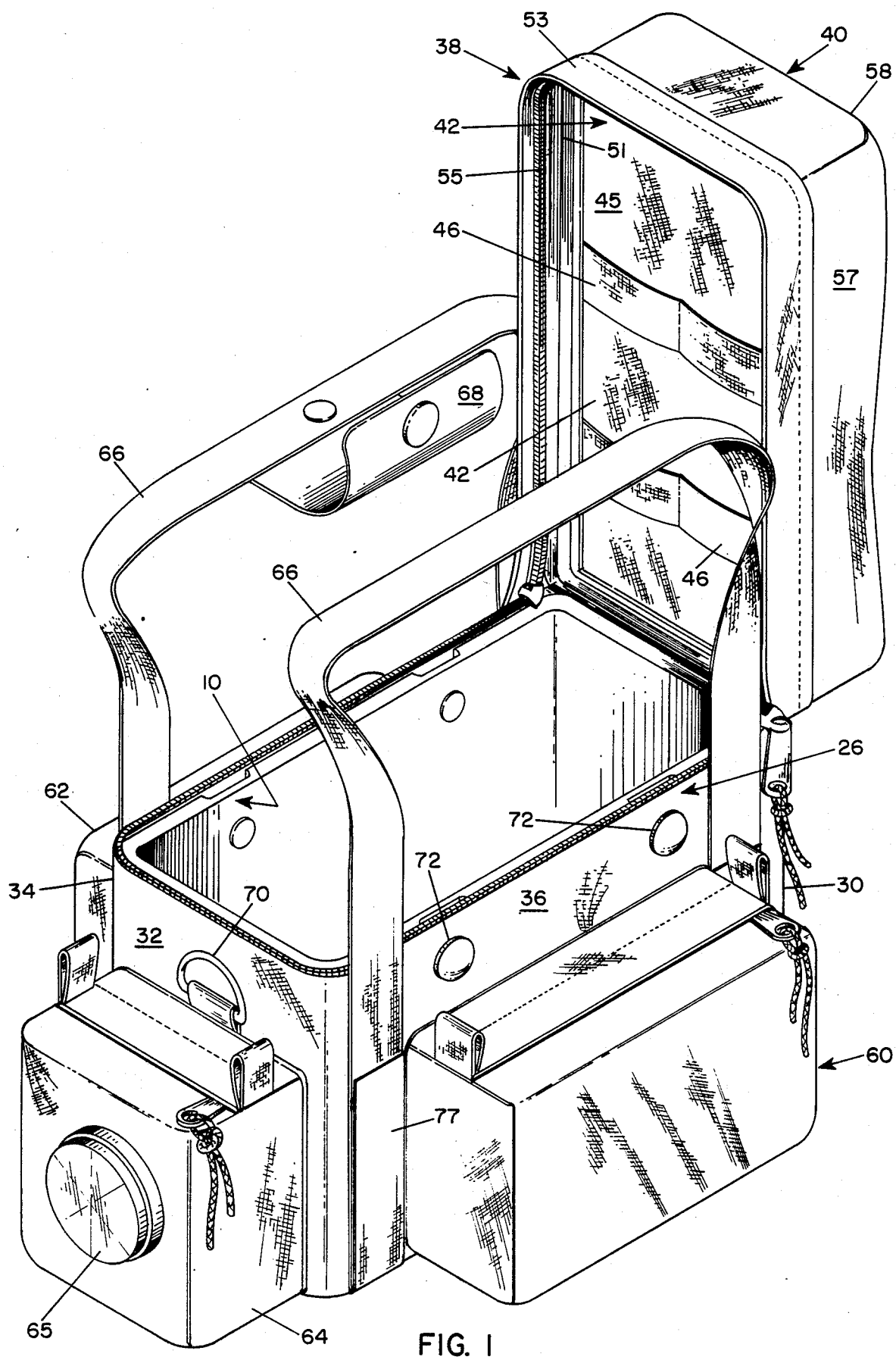
FIG. 1 is a perspective view of a rackpack embodying the present invention, the view showing the top of the rackpack in an open position.

Seen best in FIG. 1, an outer enclosure 26 of the rackpack is basically a bag made of a suitable durable fabric, such as water-repellant nylon Cordura®. It has a bottom 28 (FIG. 3), end walls 30 and 32, side walls 34 and 36 and a top 38. The top 38 of the enclosure 26 has formed thereon a separate compartment or pocket 40. Details of the construction of the top 38 are best seen in FIG. 3. A closure panel 42 is a flexible, insulating laminate, which may be a commercially available three-ply laminate of nylon tricot 43, open cell polyethylene 44, and coated nylon oxford 45. Its lower surface is liquid impervious. This laminate has good insulating qualities while it presents a soft, cushioned floor to the uppermost compartment or pocket 40. The edges of the laminate panel 42 are turned down and bound by a fabric tape 49 sewn thereto at 50 to form a bead 51. Inside a downward skirt 53 sewn thereto, the bead 51 is aligned with the top of the receptacle 10 so that when the top of the fabric enclosure 38 is closed by its zipper 55 the bead is brought adjacent the top edges of the receptacle to provide a good thermal seal to the closed rackpack.

Sides 57 and an uppermost span 58 (FIG. 1) of the fabric of the enclosure complete the upper compartment or pocket 40. Access to the compartment is through a side opening closed by a zipper (not shown).

As shown in FIG. 1, elastic bands 46 are stitched to the underside of the closure panel 42 and are useful to secure items to the undersurface of the closure panel as is known from camera cases and the like. Fresh film kept here can be maintained cool, for example.

From FIG. 1 it is apparent that the rackpack opens fully to provide access to the contents of the receptacle 10. The pocket 40 in the top of the enclosure is a desirable, but not essential, part of the construction of the embodiment. The enclosure can, of course, have a top wall defined by a single panel, preferably a panel that incorporates an insulating material. The insulating material of the top wall of the enclosure could also be a rigid foam like that of the receptacle 10. The flexible foam is desirable, however from the point of view of construction, inasmuch as it can be sewn into the top of the enclosure, and when the pocket 40 is included, the softer cushion of the flexible foam may be desirable to give the pocket a padded, lower surface.

Another optional feature of the embodiment shown in the drawings is the provision of pockets 60 and 62 on each side wall and a pocket 64 on the end wall 32. Preferably a reflector 65 is affixed to the rear of the pack. The embodiment also includes webbing carrying straps or handles 66 that can be joined conventionally by a snap-fastened connecting strip 68. D-rings 70 on each end wall of the enclosure provide fastening points for a shoulder strap (not shown).

The outer enclosure can be removed and washed. It is fastened to the receptacle by means of snap fastener parts 72 riveted through the enclosure side walls 34 and 36 in positions corresponding to the positions of the snap elements 24 on the receptacle. The outer enclosure fits closely over the receptacle, and the snaps are likewise located to maintain the fabric of the side walls 34 and 36 taut between the bottom and the fastening point. Location of the snap elements 24 in the recesses 27 keeps the fabric smooth for good appearance and better wearing of the fabric of the enclosure. As shown in FIG. 3, the rackpack is securd to bars B of a rear carrier rack C by hook and loop cloth straps 77 sewn into the seam 37 and along the side walls 34 and 36 of the enclosure at corners of the pack.

In particular, the hook-bearing cloth strip is sewn to the lower ends of each handle strap 56, which is itself sewn to the enclosure side, and the loop-bearing cloth strip is stitched into the seam 37 with the ends of the handle straps and hook-bearing strips. Hook and loop cloth fastening of the pack to the rear carrier is known per se in the prior art. Other fastening means could be substituted for the strips if desired. It is important nevertheless that the rackpack be securely held down on the platform of the carrier rack. It is also important, in accordance with the present invention, that the fabric enclosure 26 of the rackpack be firmly and securely fitted to the receptacle 10 in a manner that insures that the receptacle, as well, is securely held on the platform of the rack by the straps or other means that hold the enclosure in place. This is accomplished in the embodiment described by the tautness in the enclosure side walls between the snap fastener parts 72 and the four lower corners of the enclosure where the hook and loop straps are located.

As will be apparent to those skilled in the art, routine modifications may be made in the specifics of the above-described preferred embodiment without departure from the spirit and scope of the invention as defined in the appended claims.

I claim:

1. A bicycle rear carrier pack comprising a receptacle having a bottom, side and end walls of a substantially rigid thermally insulating material, an outer enclosure for the receptacle having a bottom, side and end walls, and a top, all of a flexible material, the outer enclosure closely fitting over the receptacle, means joined to the enclosure for fastening the pack to the platform of a bicycle rack and cooperating fastening means on the receptacle and the enclosure for securely and removably joining the receptacle and the enclosure.

2. The pack according to claim 1 wherein the fastening means includes cooperating first and second parts on the receptacle and the enclosure respectively, the first parts being secured to the receptacle and located in recesses thereon facing the enclosure.

3. The pack according to claim 2 wherein the cooperating fastening means comprise snaps having aligned male and female parts on the receptacle and the outer enclosure, each said part secured to the receptacle being located in one of said recesses on a wall of the receptacle to project outwardly less than the location of the outer surface of that wall.

4. A pack according to claim 1 wherein the top of the enclosure includes a sheet of thermally insulating material.

5. A pack according to claim 4 wherein the sheet of insulating material at the top of the enclosure is of a flexible polymeric foam.

6. The pack according to claim 4 wherein the top further comprises downward projecting means engaging upper edges of the receptacle when the pack is closed to give thermal insulation between the receptacle and the sheet of thermally insulating material.

7. The pack according to claim 6 wherein the downward projecting means is a bead of flexible foam secured to the top at a location that brings together the bead and the upper edges of the receptacle upon closure of the pack by a zipper closure operative between the top and the walls of the enclosure.

8. A pack according to claim 1 wherein the receptacle is formed in one piece from a substantially rigid polymeric foam.

9. A pack according to claim 1 where the top of the enclosure is joined to ones of said side and end walls thereof and further comprising means for releasably securing the top to the remaining side and end walls of the enclosure to close the pack.

10. A bicycle rear carrier pack comprising a receptacle having four walls and a bottom integrally formed of heat insulating liquid impermeable, rigid and durable polymeric foam, a series of outward facing recesses on at least several of the walls proximate the top thereof, a series of snap parts each secured to the receptacle in a recess, having a connection end facing outward and extending outward less than unrecessed outer surfaces of the receptacle, a fabric outer enclosure closely fitting about the receptacle, outer pockets formed on the fabric outer enclosure, a zipper closure forming an opening between a top of the outer fabric enclosure and sides thereof at a location proximate the top of the receptacle, a soft flexible foam insulating sheet secured to the top of the fabric enclosure and spanning substantially the entire area thereof to close the receptacle when the zipper is pulled closed, means for releasably securing the pack to a bicycle rack including straps secured to the pack at several locations thereon.

11. The pack according to claim 10 wherein the top of the fabric enclosure has a pocket formed therein above said soft flexible foam insulating sheet, the pack receptacle and enclosure forming longer sides and shorter front and rear walls, means for connecting a shoulder strap to the shorter front and rear walls, whereby a substantially entirely insulated and liquid imprevious portable carrier is formed by the bicycle pack.

* * * * *